United States Patent
Postel et al.

(10) Patent No.: US 8,244,736 B2
(45) Date of Patent: Aug. 14, 2012

(54) ELECTRONIC BROKERAGE SYSTEM AND METHODS OF PERFORMING THE SAME

(75) Inventors: Paul Postel, Santa Monica, CA (US); Murali Adimoolam, Culver City, CA (US); Jinbo Chen, Torrance, CA (US)

(73) Assignee: FASTXchange, Inc., Marina del Rey, CA (US)

( * ) Notice: Subject to any disclaimer, the term of this patent is extended or adjusted under 35 U.S.C. 154(b) by 495 days.

(21) Appl. No.: 11/193,176

(22) Filed: Jul. 29, 2005

(65) Prior Publication Data

US 2006/0031085 A1 Feb. 9, 2006

Related U.S. Application Data

(60) Provisional application No. 60/592,728, filed on Jul. 30, 2004.

(51) Int. Cl.
*G06F 7/00* (2006.01)
*G06F 17/30* (2006.01)
(52) U.S. Cl. .......................................... 707/748; 705/40
(58) Field of Classification Search .................. 707/748, 707/999.03; 705/40
See application file for complete search history.

(56) References Cited

U.S. PATENT DOCUMENTS

| | | | |
|---|---|---|---|
| 6,529,903 B2 | 3/2003 | Smith et al. | |
| 6,571,243 B2 | 5/2003 | Gupta et al. | |
| 6,606,619 B2 | 8/2003 | Ortega et al. | |
| 6,615,226 B1 | 9/2003 | Hartman et al. | |
| 2001/0047273 A1* | 11/2001 | Greer et al. | 705/1 |
| 2002/0147631 A1* | 10/2002 | Smith et al. | 705/10 |
| 2003/0036964 A1* | 2/2003 | Boyden et al. | 705/26 |
| 2004/0059731 A1 | 3/2004 | Yianilos et al. | |
| 2004/0128320 A1* | 7/2004 | Grove et al. | 707/104.1 |
| 2009/0254971 A1* | 10/2009 | Herz et al. | 726/1 |

OTHER PUBLICATIONS

Neches, "FAST—A Research Project in Electronic Commerce," *EM—Electronic Markets* No. 9-10:25-27 (Oct. 1993).

* cited by examiner

*Primary Examiner* — Cam Truong
(74) *Attorney, Agent, or Firm* — Kilpatrick Townsend & Stockton LLP

(57) ABSTRACT

A method of determining an optimized supplier list for a consumer using a web based client-server system is described. The method provides for receiving a query from a user and assigning a policy to the query. A search step and an evaluation step are then performed. Additional optional operational steps are provided to enhance the users buying efficiency.

13 Claims, 7 Drawing Sheets

| Item Form - All fields marked with an (*) are required | | item#4 |
|---|---|---|
| * Part No : | SNL-1123 | |
| * Commodity-Code: | 050 SPECIALTY EXTRUSIONS | |
| Manufacturer: | | item#4 |
| Choose a Manf from our list: | BRADY | |
| Or type your own here: | | |
| Distributor: | | |
| Choose a Distributor from our list: | Choose One | |
| Or type your own here: | | |

**\*Part Description:**

| FLARE END TUBE NUT (-6) |
|---|

| *Quanity: | 10 | *Unit-of-Issue: | EACH |
|---|---|---|---|
| *Order-Criteria: | Fastest Delivery | *Sourcing-Policy: | Compete |

Line Items

| | Part No | Manf | Distributor | Quantity | Commodity Code |
|---|---|---|---|---|---|
| 1 | SNL-1123 | | | 10 EACH | 42X |
| 2 | SNL-1453 | | | 10 EACH | 42X |
| 3 | SNL-4765 | | | 10 EACH | 42X |

[ NEXT ITEM ]  [ DUPLICATE ITEM ]  [ REVIEW ]  [ REMOVE ITEM ]

☐ Select only ISO certified suppliers     ☐ Select only suppliers within ___ miles ☐ Select only small businesses            ☐ Select only government approved suppliers ☐ Select custom feature  [ ]

FIG. 2

| RFS_ID | CUST_NAME | SRC_POLICY | +++ |
|---|---|---|---|
| 906164 | NLRICHARDS | COMPETED | |
| | | | |

| RFS_ID | ITEMS_ID | CUST_PN | COMMODITY CODE | MANF | QUANTITY | +++ |
|---|---|---|---|---|---|---|
| 906164 | 1 | SNL-1123 | 42X | ITECHNOLAND | 10 | |
| 906164 | 2 | SNL-1453 | 42X | ITECHNOLAND | 10 | |
| 906164 | 3 | SNL-4765 | 42X | ITECHNOLAND | 10 | |
| 906164 | 4 | SNL-2778 | 050 | GRAINGER INC. | 20 | |

| RFS_ID | ITEMS_ID | DESC_ID | DESCRIPTION |
|---|---|---|---|
| 906164 | 1 | 1 | COVER |
| 906164 | 2 | 1 | SHELVES |
| 906164 | 3 | 1 | LEDGE |
| 906164 | 4 | 1 | FLARE END TUBE NUT (-6) |

FIG. 3

|  | Suppliers | | | | |
|---|---|---|---|---|---|
| | S1<br>Method  FAX<br>Price   $75<br>Effort   3<br>Size   Small | S2<br>Method  Email<br>Price   $20<br>Effort   1<br>Size   Small | S3<br>Method  FAX<br>Price   $75<br>Effort   3<br>Size   Large | S4<br>Method  EDI<br>Price   $50<br>Effort   2<br>Size   Large | S5<br>Method  Email<br>Price   $20<br>Effort   1<br>Size   SDB |
| I T E M S  1 | PN    SN73<br>Price  $1.38<br>Qty    3<br>Avail  7/1/05 | | PN    SN74<br>Price  $2.38<br>Qty    3<br>Avail  8/1/05 | PN    SN74<br>Price  $2.50<br>Qty    3<br>Avail  1/5/06 | PN    SN74<br>Price  $2.38<br>Qty    3<br>Avail  8/1/05 |
| 2 | | PN    SN95<br>Price  $1.38<br>Qty    30<br>Avail  7/1/05 | | PN    SN95<br>Price  $2.38<br>Qty    30<br>Avail  6/1/05 | |
| 3 | PN    BX27<br>Price  $23.45<br>Qty    20<br>Avail  7/1/05 | PN    BX27<br>Price  $33.45<br>Qty    20<br>Avail  7/1/05 | | | PN    BX27<br>Price  $27.45<br>Qty    20<br>Avail  9/1/05 |
| 4 | | | PN    SN74LS<br>Price  $100.38<br>Qty    10<br>Avail  7/1/05 | | |
| 5 | PN    SN74M<br>         X<br>Price  $10.38<br>Qty    20<br>Avail  7/1/05 | PN    SN74M<br>         X<br>Price  $15.28<br>Qty    20<br>Avail  7/1/05 | | PN    SN74M<br>         X<br>Price  $17.40<br>Qty    20<br>Avail  8/1/05 | |
| 6 | | PN    NX100<br>Price  $100.38<br>Qty    11<br>Avail  7/1/05 | PN    NX100<br>Price  $133.33<br>Qty    11<br>Avail  7/1/05 | PN    NX100<br>Price  $203.11<br>Qty    15<br>Avail  8/1/05 | |
| Total(s) | | | | | |

FIG. 7

ELECTRONIC BROKERAGE SYSTEM AND METHODS OF PERFORMING THE SAME

CROSS REFERENCE TO RELATED APPLICATIONS

This application claims priority from U.S. Provisional Patent application No. 60/592,728 filed 30 Jul. 2004. The contents of which are herein incorporated in their entirety by reference.

STATEMENT AS TO RIGHTS TO INVENTIONS MADE UNDER FEDERALLY SPONSORED RESEARCH AND DEVELOPMENT

NOT APPLICABLE

Reference to a "Sequence Listing," a Table, or a Computer Program Listing Appendix Submitted on a Compact Disk

NOT APPLICABLE

BACKGROUND OF THE INVENTION

1. Field of the Invention.

The present invention is a system for conducting electronic commerce. The invention relates to electronic systems and methods for coordinating supply and demand information. A user (purchaser) places a request for materials or services into a system that can intelligently sort through data to find the fewest number of vendors likely to provide all the desired parts or services to the user, even if the user has no information about the desired part or service.

2. Description of the prior art

Electronic commerce is frequently conducted through dedicated websites representing individual sellers. E-commerce in the form of companies like Amazon.com and e-bay are now part of the commercial landscape. These companies make use of the internet to allow users to seek out products using typical browser operations. The user enters the information describing the product he or she is looking for, and the commercial web site converts that data into a format it can use effectively with its own database. The databases of the various sellers contains the inventory of the products they supply or have access to. The more specific the search query provided by the customer, the faster and easier the search the browser system can provide.

Purchasing systems based on electronic catalogs (hereinafter Catalog Systems) allows users to easily purchase items contained in the catalog. These systems typically house hundreds or thousands of items available from several different suppliers. The suppliers may place a subset of items that they can sell in their electronic catalog. If an item is available from a supplier, but it is not present in their electronic catalog, it cannot be purchased through the catalog system. Similarly, if an item is available from a supplier who is not known to the catalog system at all, the user cannot purchase the item.

Existing search engines use correlative databases and bridges to connect a user's query to the link or flag in a database that corresponds to the product the user is actually seeking. The query provides one or more key words that are used to scan a database for similar terms. Depending on the degree of character matching to the initial query, and the tolerance set in the browser application, the search engine may provide a few responses, or a large number of responses. This direct searching of databases provides users with quick and easy access to vendor products assuming the product is within the database. Methods disclosed in the prior art include several methods of parsing data and scanning databases.

U.S. Pat. No. 6,529,903 to Smith et al., describes a method and apparatus for converting a users ambiguous search query into a set of potentially disambiguated search results. The method and apparatus described by Smith utilize the input information from the user to create a second set of information that is used to scan for documents correlating to the input search terms from the first set of information. The second set of information corresponds with mapping information used by the systems document retrieval system. The retrieved results are returned to the user at the end of the search.

U.S. application 2004/0059731 to Yianilos, et al., describes a multistage intelligent database search method. The method utilizes a polygraph indexing pre-filter which serves as a front end filter to a multistage search method. The pre-filter operates using a pre-computed index of all polygraphs of some single fixed length. This pre-filter does not actually search records. In this manner a user query is resolved into a list of unique N-graphs. The pre-filter then determines a list of records sharing one or more N-graphs, and by tracking the number of N-graphs in each record, it can determine promising records in preferential order. The multistage search method then goes through a greatly reduced list of records to search to yield the search result.

U.S. Pat. No. 6,615,226 to Hartman et al., describes a method and system for a customer to order products on a web site with minimal effort (single-action ordering). The system retains user information and system identifier information to speed future transactions from the same user.

U.S. Pat. No. 6,606,619 to Ortega et al., describes a means for tracking a users "preferences" as the user searches through a hierarchical browse tree. As a user navigates through the "tree" the system and method brings items to the attention of the user based on the popularity of similar user searches. The system has a memory for the identification and recall of each user preferences on subsequent visits to the search engine. Popular nodes are elevated to the attention of the user as they navigate through the tree.

U.S. Pat. No. 6,571,243 to Gupta et al., describes a system and method for extracting information from a semi-structured information source. The system includes a listing stack for holding extracted information. A means for matching at least one extractor to the semi-structured information to return a list of potential matches is also included. The system includes a means for iterating through the list of potential matches and a means for retrieving information from a particular match in the list of potential matches. A means for adding a particular match to the listing stack can also be part of the system.

Although the search engines and database search methods of the prior art are powerful, they focus on the location of information that is already incorporated into the database and do not provide a probabilistic means for determining what type of information could be included in a database base purely on extrapolation of data contents. A prior effort to develop an electronic brokerage system was described by Anna-Lena Neches ("FAST—A Research Project in Electronic Commerce" EM—Electronic Markets No. 9-10, October 1993. pp 25-27). The paper described the initial efforts to develop an EDI-based prototype parts broker and the operation of an actual procurement system. However the publication fails to teach how the parts brokerage service would be able to provide intelligent searching ability to assist consumers in the finding of products.

Subsequent research and development in the electronic brokerage area has been performed by USC and an affiliate lab (ISI). Those efforts have yielded an electronic brokerage system having rudimentary logic used for correlating search terms with information stored in a dynamic data base. Unfortunately this same system also requires a great deal of human operation in the form of handling a wide range of interrupts that cause the electronic brokerage system to pause or halt operation waiting for a human decision. The system also suffers from the requirement that users must set up and activate an account with the server company, as well as deal with varying levels of third party (the server company) intervention from placing the order, to handling the interrupts. Often the handling of the interrupts requires the server company to communicate directly with the consumer, adding another level of human cost, and delay.

Thus there is a need in the field of electronic commerce for a database search means that can provide automated brokerage services to a client or vendor, such that an electronic system or method can determine a potential vendor for a part, service or custom manufacture even where there is no previously existing part, service or custom manufacture from which a database can directly identify.

There is further a need in the field of electronic commerce for consumers of such an automated brokerage system to be able to access and interact with such a system directly.

There is still further a need in the computer arts for a system and method for examining the contents of a database and making an automated evaluation based on some level of logic of what missing data would logically fit in the database or data structure.

These and other objectives are met in part with the presently described Dynamic Catalog System and methods.

SUMMARY OF THE INVENTION

There is provided herein a method of determining an optimized supplier list for a consumer using a web based server client computer system, the method comprising the steps of first receiving a query from a user through a web portal, the query having information on one or more goods the user desires to purchase. The second step is assigning a policy to the query, the policy having one or more search methods, and one or more evaluation methods. The third step is executing the search methods to perform a correlation operation on a partitioned database to produce a correlation list between the goods and one or more suppliers. The fourth step is evaluating the correlation list using the evaluation methods to produce an optimized supplier list.

The optimized supplier list can then be returned to the consumer through the web portal, or used by the system to obtain actual quotes from the suppliers for the desired goods. If the consumer so desires, the system can also handle the purchasing of the goods and arrange for shipping those goods to the consumer.

BRIEF DESCRIPTION OF THE DRAWINGS

FIG. 2 illustrates a sample web page for a user to place orders with.
FIG. 3 illustrates the tokenization process from a web order.
FIG. 7 Illustrates a quote matrix.

DETAILED DESCRIPTION

1.0 Introduction

Several terms are of use and are defined for the purpose of clarifying the present disclosure.

Policy: As used herein Policy refers to a two part operation utilized by the server side computer for analyzing a query submitted by a user. The policy contains a first part having one or more search methods. The search methods are algorithms used to provide correlation values between the data elements within the query submitted and database elements presented to the search method in the form of various kinds of data structures. A separate data structure is maintained for each search method. The second step of the policy is an evaluation step, wherein the results of the search method are arranged in a sourcing matrix, and then evaluated to provide an optimized supplier list for the goods desired.

Request for Quote: A user submits a request to the online or electronic brokerage system for quotes on desired products. The system searches databases and conducts the novel operation of finding commodities, services or custom parts based on the input the user, and returns to the user a quote price for the desired goods.

Sourcing Matrix: A matrix established by the present invention after determining the probability of one or more vendor's ability to provide a customer with a desired product or service. The matrix is used by the system of the present invention to determine which vendors to contact in obtaining quotes for products when the system does not possess accurate quote data within its own database.

Line Item: A line item is a single distinguishable item to be sourced, quoted, or purchased. It is typically described by a set of attributes including (but not limited to): part number, manufacturer, description, commodity name, quantity desired, unit-of-measure (bow, each, gallon, meter, foot, etc . . . ) virtually any parameter that can be used to describe a product in a catalogue.

Line Card: A line card is a representation of the product lines that a supplier can provide. Originally line cards were physical cards or sheets that listed a set of commodities and for each commodity the manufacturers that provided items within that commodity. The list may also be inverted and organized by manufacturer, with the commodities being listed under the manufacturer.

1.1 Hardware Overview

Figure 1:
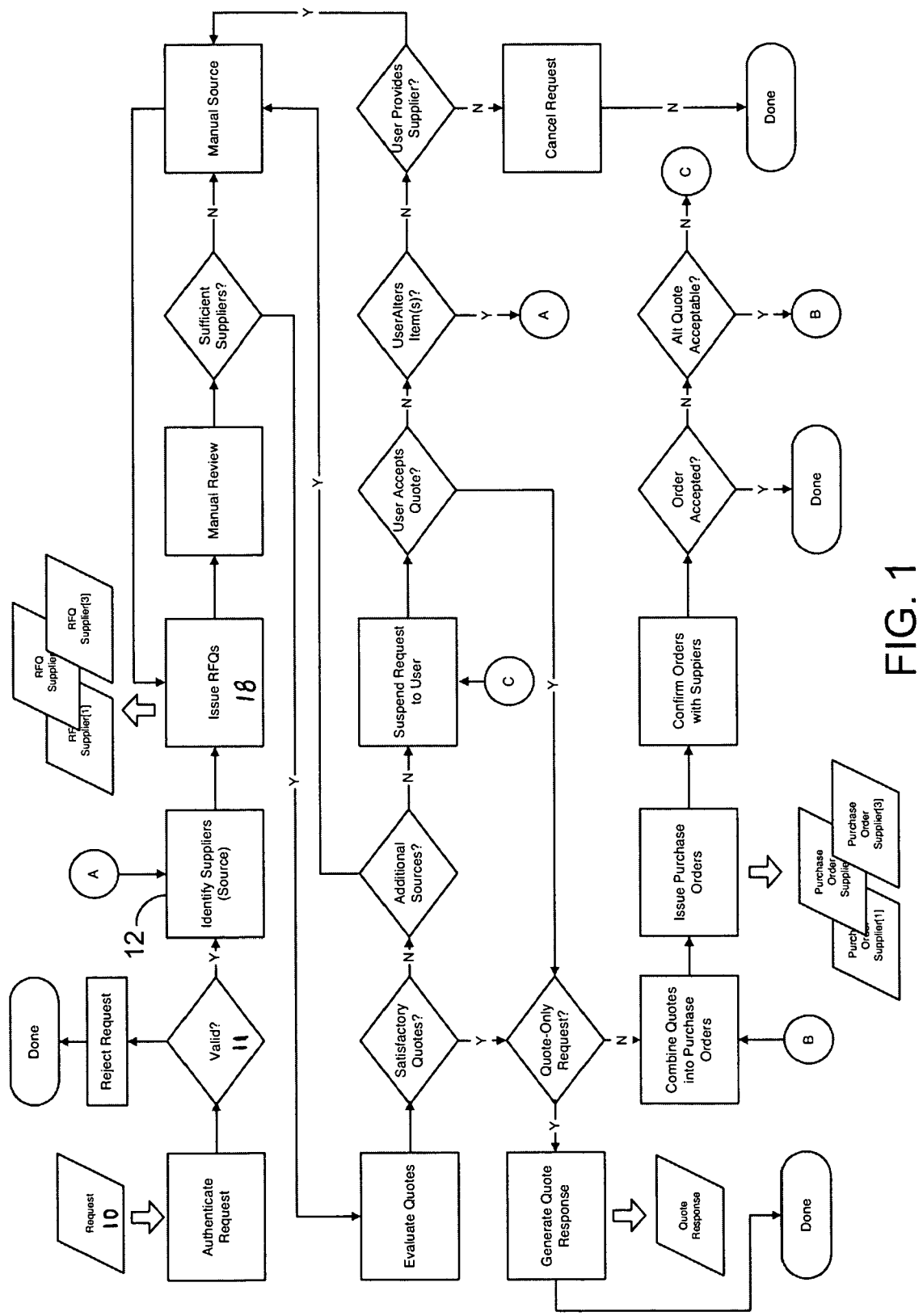
FIG. 1 Shows an overview of the electronic brokerage.

The system of the present invention maybe implement in any of a variety of suitable programming languages. Some used in the best mode include C, C++, Perl, and Java. Other languages maybe used as suitable to those skilled in the art in the application of the present invention to a particular operation requirement. The system is operational on a computer system. This invention may be implemented in a client server environment, a peer to peer network environment, or a single computer having access to the required database material. A conventional server-client computer system which includes a server and numerous clients is probably the most common mode of operation (FIG. 1). The use of the term "server" is used in the context of the invention, wherein the server receives queries from (typically remote) clients, does substantially all the processing necessary to formulate responses to the queries, and provides these responses to the clients. However, the server may itself act in the capacity of a client when it accesses either remote or internal databases. These databases may exist at another node acting either as a database server, or a portal for a separate network to which the present invention is able to gain access to.

The hardware configurations are in general standard and will be described in brief. In accordance with known practices, server includes one or more processors that communicate with a number of peripheral devices via a bus subsystem. These peripheral devices typically include a storage subsystem, comprised of memory subsystem and file storage subsystem, which holds computer programs (e.g. code or instructions) and data on suitable storage medium. A user interface is necessary (e.g. keyboard and screen or other GUI device) as well as any desired output devices (e.g. printer, e-fax, etc.). Preferentially there are interface devices to outside networks such as Ethernet, Token Ring, ATM, IEEE 801/802, ITU X.25, Serial Link Internet Protocol (SLIP) or a public switched telephone network. This interface is shown schematically as a "Network Interface" block. It is coupled to corresponding interface devices in client computers via a network connection.

Client has the same general configuration, although typically with less storage and processing capability. Thus, while the client computer could be a terminal or a low-end personal computer, the server computer is generally a high-end workstation or mainframe, such as a SUN SPARC™ server.

The user interface input devices typically includes a keyboard and may further include a pointing device and a scanner. The pointing device may be an indirect pointing device such as a mouse, trackball, touchpad, or graphics tablet, or a direct pointing device such as a touch screen incorporated into the display. Other types of user interface input devices such as voice recognition systems are also possible.

The user interface output devices typically include a printer and display subsystem, which includes a display controller and a display device coupled to the controller. The display device may be a cathode ray tube (CRT), a flat-panel device, or a projection device. Display controller provides control signals to the display device and normally includes a display memory for storing the pixels that appear on the display device. The display subsystem may also provide non-visual display such as an audio output.

The memory subsystem typically includes a number of memories including a main random access memory (RAM) for storage of instructions and data during program execution and a read only memory (ROM) in which fixed instructions are stored. In the case of Macintosh-compatible personal computers the ROM would include portions of the operating system; in the case of IBM-compatible personal computers, this would include the BIOS (basic input/output system).

The file storage subsystem provides persistent (non-volatile) storage for program and data files, and typically includes at least one hard drive and optionally, one or more removable drive (e.g. Floppy drive, memory key, CDR, removable HD, Tape drive, etc.). One or more of the drive devices may be located at a remote location, such as in a server on a local area network or at a site of the internet's World Wide Web.

In this context, the term "bus subsystem" is used generically so as to include any mechanism for letting the various components and subsystems communicate with each other as intended. With the exception of a particular user's input and output devices, the other components need not be at the same physical location. Thus, for example, portions of the file storage system could be connected via various local-area or wide-area network media, including telephone lines. Similarly the input devices and display need not be at the same physical location as the processor, although it is anticipated that the present invention will most often be implemented in the context of PCs and workstations.

Bus subsystem is shown schematically as a single bus, but a typical system has a number of buses such as a local bus and one or more expansion buses (e.g., ADB, SCSI, ISA, EISA, MCA, NuBus, PCI, PCIMCIA, AGP, etc . . . ), as well as serial and parallel ports. Network connections are usually established through a device such as a network adapter on one of these expansion buses or a modem or a serial port. The client computer may be a desktop system or a portable system.

The user interacts with the system using interface devices. For example, client queries are entered via a keyboard, communicated to client processor, and thence to network interface over bus subsystem. The query is then communicated to a server via network connection. Similarly, results of the query are communicated from the server to the client via network connection for output on one of the devices (e.g. display or printer), or may be stored on storage subsystem.

A server and a client or a multiplicity of clients, may interact with the server via the internet or any other communications method. The server has processing components and functions which occur in the server's program and data storage devices. A TCP/IP "stack" works in conjunction with the operating system to communicate with processes over a network or serial connection attaching server to internet. Web server software executes concurrently and cooperatively with other processes in server to make data objects available to requesting clients. A Common Gateway Interface (CGI) script enables information from user clients to be acted upon by web server, or other processes within the server. Responses to client queries may be returned to clients in the form of a Hypertext Markup Language (HTML) document outputs which are then communicated via internet back to the user.

Client possesses software implementing functional processes operatively disposed in its program and data storage. TCP/IP stack, works in conjunction with the operating system to communicate with processes over a network or serial connection attaching client to internet. Software implementing the function of a web browser executes concurrently and cooperatively with other processes in client to make requests of server for data objects. The user of the client may interact via the web browser to make such queries of the server via the internet and to view responses from the server via the internet on the web browser.

1.2 Process Description

The overall process description can be seen in the flowchart of FIG. 1. Although the over view includes a large number of steps, the present invention corresponds particularly to the operations from the request up to the identify suppliers 12. Thus these steps are presently identified and detailed herein. The need addressed by the dynamic catalogue system described herein is to provide users with an optimized supplier list for goods the consumer wishes to purchase. When the consumer is unaware of who provides a particular good, or how much it will cost, the user can access the dynamic catalogue system and search for the desired goods.

Provided herein is a method of determining an optimized supplier list for a consumer using a web based client server system. The method comprises the steps of first receiving a query from a user through a web portal, the query having information on one or more goods the user desires to purchase. The second step is assigning a policy to the query, the policy having one or more search methods, and one or more evaluation methods. The third step is executing the search methods to perform a correlation operation on a partitioned database to produce a correlation list between the goods and one or more suppliers. The fourth step is evaluating the correlation list using the evaluation methods to produce an optimized supplier list.

The client server system corresponds to any client server relation as are well understood in the art. For purposes of this discussion, the general client server relation referred to herein assumes an individual client computer which is located at a users place of business or residence, and a server system located at a different place of business. This client server is popularly referred to as operating through the world wide web or other domain used for remote access of another computer. Any access between the client and a physically different server we refer to herein as the "internet."

Using a client site computer, a user can log into the internet and access a web page or web portal for the present system. The user provides a query for material he is shopping for. This query may be specific information that provides exact details of what is to be purchased (such as the International Standard Book Number or ISBN). If so the system can quickly find the desired object using any variety of search and find techniques well understood in the art. However if the user provides incomplete details of the material he desires to purchase, or has a long list of items he wishes to purchase which may come from multiple vendors, then the user is required to spend the time and effort to manually track down the material he wants to buy, and order the information separately from each supplier as he locates them. This model works well for people who only need to buy a few things, or have time to search the internet. However it can be a burden in time and money for purchasers who want to reduce labor or processing costs associated with buying goods or services.

In the first step of the novel method, the system receives a query from a user through the web portal. The query contains what ever information the user has about the desired material the user wishes to purchase. The query may have detailed descriptions of each part, or it may simply include a description for a generic item needed (such as a fastener or screw).

In the second step the method assigns a policy to the query. The user may make certain preferences known to the system to assist in the system operating with desired parameters the user has. For instance some businesses may only want to purchase from small businesses, or from suppliers on an approved list (such as an ISO qualified vendor, or a government sanctioned vendor). If the user does not elect any preferences in the query page when placing his "order" the system will assign a policy based on its internal logic. The policy has two parts to it.

The third step involves the executing of the first part of the policy. That is the executing of one or more search methods that are incorporated into the policy. These search methods utilize standardized or proprietary algorithms to compare the items of the query with similar items in a corresponding data structure. Note the query has been reduced into simpler bit strings for the system to utilize, called line items. However the process by which this is done is not novel to the present invention and the collective line items produced from the query are still referred to as the "query" herein simply for ease of reading. The data structure is derived from a data base within the system of the present invention. The data structures use a similar algorithm in parsing the database into data structures for search purposes. Once a search method is executed on the query, the system determines if any other search methods should be used. If so, the system executes each search method in turn to produce a correlative list of the material from the query, to the corresponding material from the corresponding data structures. The correlative list is a matrix of values or probabilities assigned to each good the user desires to purchase. The matrix identifies the good and vendor or suppliers in a table, with the probability of the vendor or supplier having the good at the intersection of the table.

The fourth step is the execution of one or more evaluation methods. Once the system has run the last search method on the query, one or more evaluation methods are executed on the correlative lists. The evaluation method utilizes a different logic from the search method to determine which vendors will provide the most economical group of suppliers to provide all the goods in the query. The evaluation method may have restrictions on it that require the system to include vendors it would ordinarily exclude based on its own internal logic (such as including ISO certified vendors, or only manufacturing companies located within the United States.) There is no limit to the restrictions or parameters that the evaluation method may have. However a user will generally prefer an evaluation method having the greatest flexibility so that a highly optimized supplier list is identified and returned for the search query.

Once the optimized list of suppliers has been identified by the system there are multiple paths the system may take. In a first embodiment the system will halt its operations for the user and simply return the optimized list of suppliers to the user through the web portal.

In a second embodiment the system will seek out the identified suppliers and perform a request for quotes step. In this process the system will contact the suppliers on the optimized supplier list and query each of them for a price quote for the desired good. This operation is frequently done by one computer system communicating with another. However some suppliers do not have automated quote processing. In this case the system can produce a request for quote in a manner that the supplier can understand. One example is the sending of a fax asking for the desired materials. Another is an automated e-mail from the dynamic brokerage system to the supplier requesting a price quote. A third less desirable option is for a human to contact the supplier directly and obtain a manual quote. Once the quote is obtained, the system may return the quotes to the user or act on the quote information.

In a third embodiment the system may obtain goods for the user. Once the vendor or supplier provides the requested quote, the system can relay that information to the user for the user to order the goods themselves, or the policy from step two above, may include directives for the dynamic brokerage to actually obtain the goods for the user. In this embodiment the system processes the quotes into a quote matrix and determines the optimal supplier list for the actual purchasing of goods in case the returned quotes have deviations from the expected quote returns produced in the system in the first embodiment.

In yet another embodiment, the system and method previously described can be utilized in a more general sense. The policy may be geared more toward inventory tracking or providing services. The system can be adapted to provide users with information on service providers where some details are unknown in the search query, or provide inventory details where some part information is known but the majority is unknown.

Before the system of the present invention can accept queries from any user, any existing data in the systems data base must be arranged and sorted into readable data structures that will work with the various sourcing methods. The database does not have to be restructured every time a query is received, instead each time the database is used to produce an appropriate data structure, that data structure is preserved for use with all appropriate queries.

The database of the present system consists of all the relevant information the system is programmed to retain from any valid quote it has used in the past. The initial kernel is populated from data that is manually entered into the system based on information obtained from suppliers and vendors. Each entry, whether input manually or integrated automatically, has numerous other attributes the system uses to track the information. For instance, each entry may have a time and data stamp so the system will know when that information was received, and whether it is probably still valid or not.

Multiple search methods are provided below, but in order to focus the operation of the system, only one example search method will be detailed. This detailing is merely illustrative and is not meant to be limiting in any sense. For illustrative purposes only, we follow an example using a "K-means algorithm." In order for the methods to utilize a K-means sourcing method, a corresponding "K-means" data structure must be created. The procedure is as follows:

Start with a body of valid quotations provided by suppliers. Each quotation consists of a set of descriptors including one or more of: a part number, a description, a manufacturer name, a distributor name, a quantity, etc.

Pass each quotation through a tokenizer which produces a list of tokens for each quotation. First, the tokenizer throws out common words that are not useful in clustering items (so called "Stop Words"). Next the tokenizer produces the list of tokens in generic terms (reducing all integer strings into categories (<integer>, <small-int>, <large-int>for example). Next the tokenizer maps certain specific tokens or strings of tokens or concepts into more generic concepts. This includes mapping variations on common manufacturer and distributor names into a canonical form. For example, consider the following descriptions of two resistors:

Description1: "vishay/dale 36K ohms 2%"
Description2: "vishay 300K ohm 5%"

By a strict string comparison, they have very little in common, yet the items that they describe are from the same specific commodity. The first parse produces:

vishay/dale, 36, K, ohms, 2, %
vishay, 300, K, ohm, 5, %

This reduces to:

<vishay/dale>, <integer>, <k-mult>, <ohms>, <small-int>, <pct>
<vishay>, <integer>, <k-mult>, <ohm>, <small-int>, <pct>

Then finally to:

<vishay>, <k-measure>, <impedance>, <small-pct>
<vishay>, <k-measure>, <impedance>, <small-pct> where the system now have two identical documents.

After the tokenizer has processed the quotes, the system have a set of rows of the form:

Supplier Identifier, [<token1>, <token2>, <token3>, <token4>, . . . ]

Where each row indicates that the supplier has provided a quote in past that can be represented as "[list of tokens]".

Next the system divides the set of rows up into similar "clusters" by examining the token lists for each quote. The system uses the K-means algorithm to do the clustering. The system performs the clustering hierarchically. That is, the system divides the entire set into n clusters. Next the system divides each of those n clusters into m clusters by applying the K-means algorithm to each of the n clusters, and so on. This divides the original group up into a hierarchy where each level contains a set of similar quotes, as defined by the K-means algorithm. The system can give these groups arbitrary names. For example, the system names the top-level clusters as {K0, K1, K2, . . . K9}, the next level clusters as {K0 #0, K0 #1, . . . K9 #9}, etc. More levels in the hierarchy mean more specific clusters.

Next the system bind each cluster name to the suppliers that provided one or more quotes that belonged to the cluster. For example the list:

TABLE 1

| Supplier id | Token List |
|---|---|
| 100 | T1 |
| 100 | T2 |
| 200 | T3 |
| 300 | T4 |
| 400 | T5 |
| 500 | T6 |
| 500 | T7 |
| 600 | T8 |
| 600 | T9 |

Might produce clusters (where "T1" represents the list of tokens produced by a quote from supplier #100, "T2" represents a list of tokens produced by a second quote from supplier #100, etc.):

TABLE 2

| Top-level Cluster | Level 1 Cluster | Supplier id | Token List |
|---|---|---|---|
| K0 | K0#0 | 100 | T1 |
|  | K0#1 | 200 | T3 |
|  |  | 300 | T4 |
|  | K0#2 | 100 | T2 |
|  |  | 400 | T5 |
| K1 | K1#0 | 500 | T6 |
|  |  | 500 | T7 |
|  |  | 600 | T8 |
|  | K1#1 | 600 | T9 |

Now the system knows for each supplier, which clusters they have provided quotes for in the past.

TABLE 3

| Supplier id | Top-level cluster | level1 cluster |
|---|---|---|
| 100 | K0 |  |
|  |  | K0#0 |
|  |  | K0#2 |
| 200 | K0 |  |
|  |  | K0#1 |
| 300 | K0 |  |
|  |  | K0#1 |
| 400 | K0 |  |
|  |  | K0#2 |
| 500 | K1 |  |
|  |  | K1#0 |
| 600 | K1 |  |
|  |  | K1#1 |

Now that a data structure has been created for the "K-means" algorithm, the system can receive and process requests from users and utilize this means on the query to produce a useful product for the user. It is important to remember that each of the illustrative sourcing methods described below would utilize a corresponding method on the database to produce a corresponding data structure for use with the sourcing method. The data structures are maintained by the server in persistent memory and are updated as needed, usually only when there is a fundamental change to the searching method is implemented. Changes in the data base are automatically reflected in the data structures, thus there is no need to revamp the data structures with every update in the database.

The method of the present invention is now illustrated in detail, the method comprising the following steps with detailed description.

Step (a): Receiving a query from a user.

The first step in providing a supplier list to a user through a web portal using a web based client server computer system is to receive a query from a user through the web portal. The query having information for one or more goods the user desires to obtain (FIG. 2). The query is converted by the system into a set of line items where each line item describes a product or service to be sourced and/or quoted and/or purchased (FIG. 3). Once a user has been identified by the system, the user can supply a list of materials or parts the user desires to find a vendor for. The user provides the parameters needed by the system to find the merchandise the user is looking for. The parameters can include part names, manufacturing information like serial numbers, manufacturer and locations of preferred manufactures, part descriptions, expected and desired pricing information, material composition and any other information the user wishes to supply, or the system specifically asks the user to supply.

The parameter data of each part or piece of merchandise may be used by itself to track down the desired part, or it may be used in conjunction with additional line item information. Such additional information can take any form. Examples are restrictions on price (do not exceed a particular dollar amount per item), vendors (seek from small businesses only, or seek small businesses preferentially), exclusion of materials (only look for brass or copper for water piping) source restrictions (seek only manufactures based in the United States). Some examples are illustrated in the bottom box of FIG. 2.

The system now performs a step, in which the query is broken down into a series of tokens that the system can use to scan for relevant matches (FIG. 3). The tokenizer takes into account the origin of the each piece of data. For example, values in the Manufacturer Name field are matched against common manufacturer abbreviations and are reduced to a canonical form. Similar tokens found in descriptive text are matched against common abbreviations and syntax and converted to a set of canonical tokens.

Additional logic can be applied to the correlation methodology. For instance the user may specify that there are certain parameters that are not desired in the search, and may provide exclusion parameters for the line item correlation function. Alternatively there may be parameters that are ancillary to the query that are highly desirable. The user can make these specifications as well so that some n-graphs or bit strings are converted into line items of high weighted value than others in the extrapolation search, or in the final development of the table showing the probability of finding a source for the desired query. The user may select the additional logic based on check boxes or selectable icons in the web page. The additional logics may correspond to additional sourcing methods or evaluation methods.

The parameter data or line item data fills out a screen on a user web page, and corresponds to an input data table which is cross referenced against a larger self maintaining database as described below.

Although the dynamic brokerage system has performed a number of operations on the information contained in the original query provided by the user, the input data representing the user's desire is still referred to herein as the query for simplicity.

STEP (b): Assigning a policy to the query.

Figure 4:
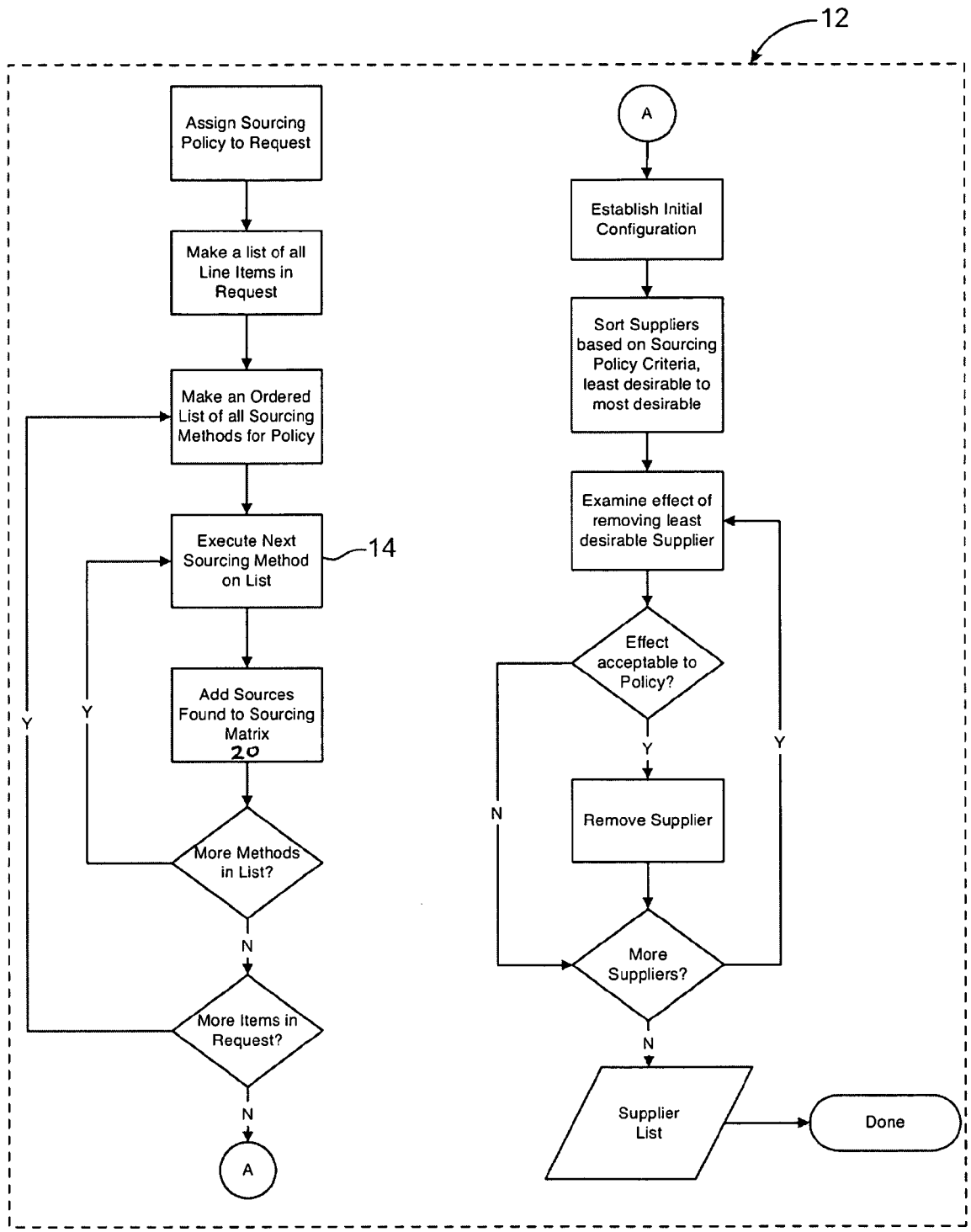
FIG. 4 Provides a sourcing policy flow chart.

The next step is to assign a policy to the query, the policy having one or more search methods and one or more evaluation methods associated with it (FIG. 4). The policy is merely nomenclature for tracking which search methods (also called sourcing methods) and which evaluation methods are associated with a particular query. As can be seen in the illustration, FIG. 4 is a detailed view of the step identified as "identify Suppliers" 12 from FIG. 1.

STEP (c): Executing the (next) search methods.

Figure 5:
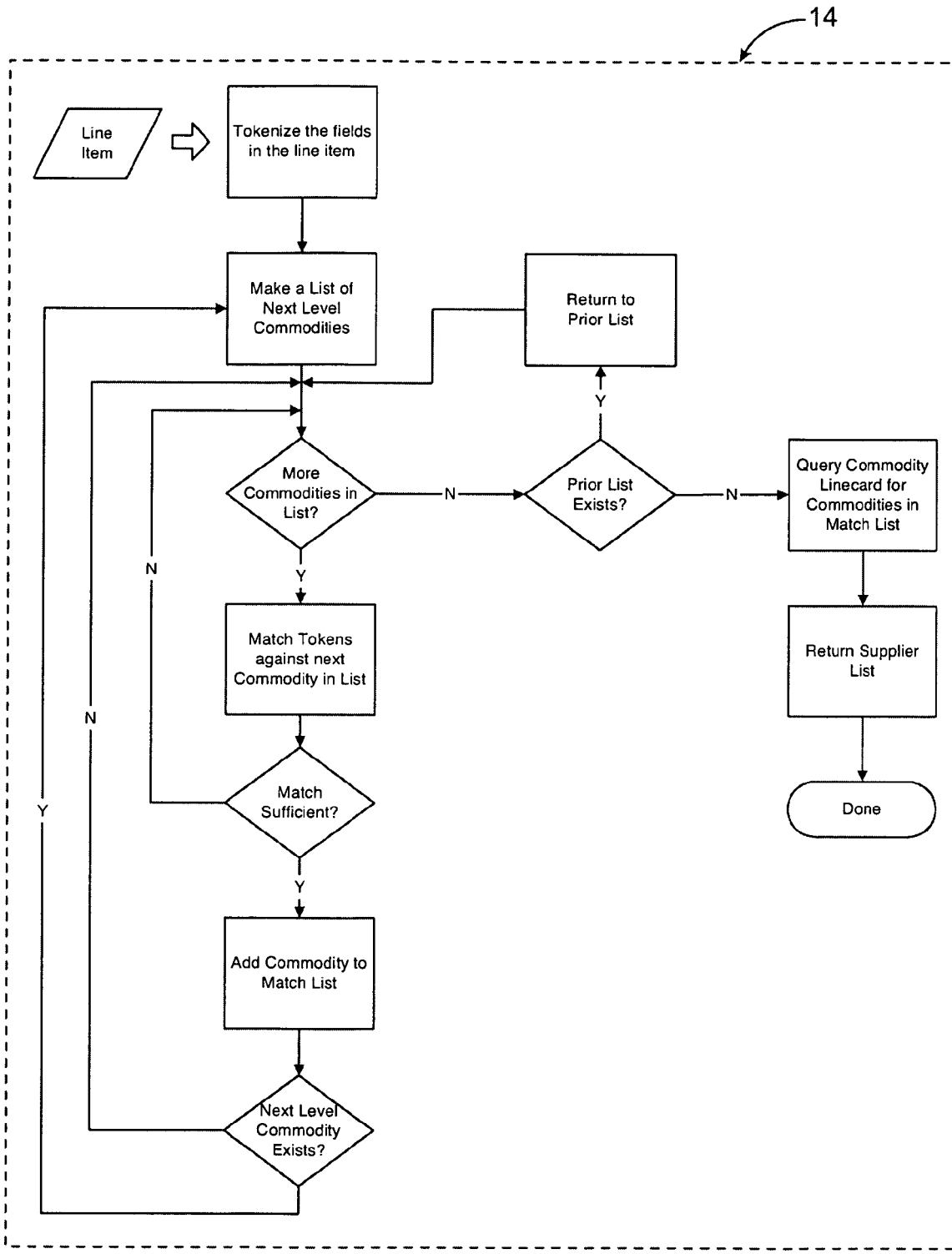
FIG. 5 Shows an example of a sourcing method flow chart.

After the policy is selected, the search methods are executed on the query to perform a correlative operation on a partitioned database (the appropriate data structure matching the particular sourcing method) to produce a correlation list between the goods identified in the query, and the suppliers listed in the database. The step identified in FIG. 4 as "Execute Next Sourcing Method on List" 14 corresponds to the detail steps illustrated in FIG. 5. In FIG. 5 we show the process for one of the sourcing methods (K-means) and following the execution of this sourcing method, any additional method may be used as required by the sourcing policy. A sourcing method takes as input a line item to be sourced as well as the individual customer supplying the request and the company to whom the customer belongs. Each sourcing method returns 0 or more candidate suppliers for the line item and an associated probability of those suppliers returning a quotation for the item.

The algorithm is as follows:

```
Foreach sourcing method in the sourcing policy {
    Foreach line item in the request {
        Execute the sourcing method
    }
}
```

Sourcing methods can obtain their supplier data from a number of different sources. The system of the present invention preferably maintains a detailed database of its own prior quote history. It also can import the quotation or purchasing history of other companies as well as the catalogs of particular suppliers. In addition, the system maintains a set of "linecards" for suppliers. A linecard describes the offerings of a supplier in terms of the manufacturers and/or the commodities the supplier carries. Typical source methods examine this data to obtain candidate suppliers. They may perform a simple match on the part number, on some substring of the part number, on the manufacturer, on the commodity, etc. The system computes the probability of obtaining a quote from a supplier obtained by a given method empirically, based on prior experience with that method. The structure is flexible, in that it allows customized sourcing methods to be added, such as methods that select suppliers with whom the customer has a preferential pricing agreement.

An additional method for the sourcing method to retrieve the desired information is to directly query a supplier's electronic catalog or inventory list. Since so much of commerce and inventory information is now maintained through computer based databases, the method of the present invention includes an optional operation where the present invention can query, through a communication channel (authorized or public), a database maintained by a supplier. The supplier may have a confidential inventory list that will only be accessible to the system through a secure portal (requiring a query, acknowledgment and remote hand-shake to access) or the vendor may maintain a public domain list. The method of the present invention can query either type of database to increase the probability of determining whether a supplier has a part of interest, or has the ability to order or create the part based on its existing inventory. Note in the case of a vendor being able to manufacture the desired part (say a custom part) the customer must provide sufficient information of materials required and tooling parts needed to allow the brokerage system disclosed herein to make a judgment as to whether the vendor would be an appropriate supplier of the custom part.

One may use a commodity-based method for locating candidate suppliers. This method requires that each item be classified as a particular commodity. As the system obtains quotes from suppliers, the system records the fact that the supplier provided a quote not just for the item, but for the commodity class that the item belongs to as well. When new items arrive, the system determines the commodity and then matches the commodity against our database.

The problem with this method is that the system rarely receives accurate information regarding the commodity classification of items the system receives. Different companies (and different individuals) may classify the same items differently, or users may classify different items as the same. The specificity of the classification may also vary greatly. For example, one customer classifies all items into only 3 categories. The inexactness of human classification can be countered using the sourcing methods described herein. Going back to the previous example in which a data structure was created using the "K-means" algorithm, a "K-means" algorithm can now be used to process the material from the user query.

The K-means sourcing method uses this information to identify suppliers capable of quoting particular items.

The procedure is as follows:

1. Tokenize the item(s) to be sourced, using the same tokenizer as was used above.

2. Use the Vector Space Model to match the tokens obtained above to the tokens in each of the cluster groups. Choose the cluster group with the best match (or choose groups where the match is above some threshold value. this is the process by which we take a new query for a single item or good and compare it a given cluster and determine how good a match it is for that cluster.)

Now compare the tokenized line item to each top-level cluster. The process is as follows:

For each token t, compute two probabilities, $g(t,k_n)$, the probability of token t occurring in cluster $k_n$ and $h(t,k_n)$ the probability of token t's occurrence outside of that cluster (e.g. $k'_n$)

Where $c(t,k_n)$ is the count of occurrences of token t in cluster $k_n$

And $c(k_n)$ is the count of quotes in cluster $k_n$

As:

$$g(t, k_n) = \frac{c(t, k_n)}{c(k_n)} \text{ and } h(t, k'_n) = \frac{c(t, k'_n)}{c(k'_n)}$$

then $$p(t, k'_n) = \frac{h(t, k'_n)}{h(t, k'_n) + g(t, k_n)}$$

gives the probability that a given query containing the token t is not a member of cluster $k_n$ Now compute our degree-of-belief using Bayesian statistics as:

$$f(t) = \frac{(s*x) + (n*p(t))}{s+n}$$

Where s is the strength we want to give to our background information x is our assumed probability that a new token will not be a member of cluster $k_n$ and n is the total number of quotes that contain token t Now compute a value Q by combining the individual f(t)'s using the "Fisher" method. Q is a measure of the probability that the quote containing the token list is not a member of cluster $k_n$ $$Q = C^{-1}\left(-2\ln \prod_w f(w), 2n\right)$$

Where $C^{-1}(\ )$ is the inverse chi-square function.

Similarly compute a value R, a measure of the probability that the query containing the token list is a member of cluster $k_n$ using (1−f(t))

$$R = C^{-1}\left(-2\ln \prod_w 1 - f(w), 2n\right)$$

Finally, compute I as:

$$I = \frac{1+Q-R}{2}$$

When I is near 1, the evidence indicates that the query likely is a member of $k'_n$. When I is near 0, the evidence indicates that the query likely is a member of $k_n$.

3. Repeat step 2 above with the next level of cluster groups.

4. Lookup the suppliers that are associated with the best cluster group(s)

5. Return those suppliers.

As described earlier, a sourcing method is a function that accepts a line-item to be purchased and produces 0 or more candidate suppliers for that line item. Examples of some sourcing methods used in the commercial application of the present invention are described below. It should be kept in mind this following list is neither exhaustive nor is each method fully detailed in the manner the K-means method has been described in the interest of maintaining the description to a readable length.

CUST-SPECIFIED: This is the simplest of all sourcing methods. Here the customer has specified a particular supplier that the system should use to obtain a quote. Note that even this method is not 100% successful in obtaining a quote. The supplier may not carry the product, may be out of stock, etc. For this method, it is mandatory that the system contact the specified supplier and attempt to retrieve a quotation.

CUST-SUGGESTED: This method is similar to the CUST-SPECIFIED method, however here it is not mandatory that the system contact the supplier, it is merely a suggestion. If the system is able to identify suppliers who look to be better candidates, the system need not contact the suggested supplier.

VALID-QUOTE: This method queries a database of prior quotations and/or catalogs and looks for an unexpired quotation for exactly the part identified in the request. The match is based on the part number and the manufacturer (if present). The pricing on the quotation must also be valid for the company or vendor that sent the item in. If this sourcing method succeeds, then there is no need to contact the company or vendor since there is already a valid quote available.

QUOTE: This method is similar to VALID-QUOTE, except that it includes quotes that have expired or were for obtained for companies other than the company requesting this item.

LINECARD(N): This method looks at the prior history quoting the manufacturer contained in the requested item. The system counts the set of suppliers who have provided a quotation for this manufacturer to the requesting company. If the distinct number of suppliers is less than or equal to a threshold value ("Narrow_History_Threshold"), the system will return all the suppliers as potential sources. If the number of suppliers found is greater than Narrow_History_Threshold, then this method returns no suppliers (typically the system fall back on the next method LINECARD(W) which distinguishes between a larger set of suppliers who have provided this manufacturer).

LINECARD(W): This method also queries our prior history based on the manufacturer, identifying the "best" candidate suppliers when the number of suppliers having quoted this manufacturer is greater than the threshold value ("Narrow_History_Threshold"). The system starts by making a list of the distinct set of suppliers who quoted this manufacturer. Next the system looks at the historical performance for those suppliers quoting that manufacturer to the current company. The system will return those suppliers that are at least Quoting_Performance_Sigmas standard deviations better than the mean performing supplier.

SOLE-SOURCE: This method queries the supplier "line card" database. Line cards form a hierarchical representation of a supplier's offering. Each supplier offers items that fall into one or more commodities. Within each commodity, the supplier may carry several different manufacturers' products. This method counts the total set of possible suppliers for this item based on manufacturer and/or commodity. If the system finds exactly one supplier listed as supplying this manufacturer and/or commodity, the system considers that supplier a "Sole-Source" and the system returns that suppliers name.

SOLE-SOURCE(S): This is identical to the SOLE-SOURCE method except that it returns suppliers if the set is less than or equal to the constant value Almost_Sole_Source_Threshold. This method is separate from the SOLE-SOURCE method only because it returns a different probability.

SUPER-STRING: This method looks for substring matches for the part number requested in the quoting history/catalog databases. First the part number is converted to a canonical form by removing any punctuation or white space characters and then the match is performed. In the preferred embodiment the match requires at least the first 75% or 7 characters (whichever is larger) of the requested part number to be an initial substring of the matched part number. In addition, the length of both part numbers must be within 10% of each other. The match percentage or character length may be set higher or lower depending on the type of search information sought and the degree of flexibility desired.

PREFERRED-SUPPLIERS: This is a company-specific method that adds preferred suppliers for certain commodities, manufacturers, part numbers, or combinations thereof. Some companies have agreements with suppliers that guarantee that those suppliers will be given the opportunity to bid on each item that falls into a certain category (e.g. Passives, cabling, test equipment, etc.). This method implements that requirement.

SIBLING: This sourcing method applies to an entire set of items rather than a single item. The system applies this method last, after all other methods have been applied to the items individually. The sibling sourcing method assigns suppliers to requested items simply because another item associated with the first item had a particular supplier assigned to it. This method exists for two reasons: first, most requestors tend to group similar items together in a request. This means that if you have a good supplier for item 1, that supplier may well be able to supply the remaining items in the request as well. Second, if the system is going to go to the effort of contacting a supplier for item 1, the system should lump in any other items that the system believes are similar to item 1 as well.

The system does not simply group all items together by default. The system attempts to group items together when the system has reason to believe they are similar. The system determines similarity by comparing the commodity code, manufacturer, and part numbers of the items. The hierarchy of operation in the electronic brokerage is the process goes from a valid request 11 (FIG. 1) to the Identify Supplier 12 step. The Identify supplier 12 step entails the operations of FIGS. 4 and 5. Once the operation of FIG. 4 reaches the step of Execute Next 14, the operation carries through the process steps in FIG. 5. When the operation reaches the conclusion of the process in FIG. 5 (done) it resumes in FIG. 4 with the "Add Sources Found to Sourcing Matrix" 20 step. When the process in FIG. 4 is complete, the process returns the supplier list, and proceeds with the next step which may be an Issue RFQ 18 step.

After the system applies one or more of the sourcing methods, the result is a sourcing matrix, where the columns contain the suppliers, the rows contain the line items, and the cells contain the probability of the supplier providing a quote for the item as well as other details about the supplier (e.g. the sourcing method used to obtain the supplier, the effort required to obtain a quote from the supplier, the age of the information used to find the supplier, etc.).

TABLE 4

| | | Sourcing Matrix | | | |
| --- | --- | --- | --- | --- | --- |
| | | | Suppliers | | |
| ITEMS | S1 | S2 | S3 | S4 | S5 |
| 1 | Method Quote<br>P(q) 0.7<br>Effort 1<br>Size Small | | | Method Quote<br>P(q) 0.7<br>Effort 2<br>Size Large | |

TABLE 4-continued

Sourcing Matrix

| ITEMS | S1 | S2 | S3 | S4 | S5 |
|---|---|---|---|---|---|
| 2 | | | Method Quote<br>P(q) 0.7<br>Effort 0<br>Size Medium | | |
| 3 | Method Linecard<br>P(q) 0.5<br>Effort 1<br>Size Small | Method Quote<br>P(q) 0.7<br>Effort 0<br>Size Large | | | Method Quote<br>P(q) 0.7<br>Effort 0<br>Size Large |
| 4 | | Method Quote<br>P(q) 0.7<br>Effort 0<br>Size Large | | | |
| 5 | | | Method Quote<br>P(q) 0.7<br>Effort 0<br>Size Large | | |
| 6 | Method Quote<br>P(q) 0.7<br>Effort 1<br>Size Small | | | | |
| Total(s) | Method Quote<br>P(q) 1.9<br>Effort 1<br>Size Small | Method Quote<br>P(q) 1.4<br>Effort 0<br>Size Small | Method Quote<br>P(q) 1.4<br>Effort 0<br>Size Large | Method Quote<br>P(q) 0.7<br>Effort 2<br>Size Large | Method Quote<br>P(q) 0.7<br>Effort 0<br>Size Large |

Step (d): Evaluation Step

Now the system must reduce the sourcing matrix to the minimum set of suppliers that satisfy the goals of the sourcing policy (assigned to the query in step 2). In addition to providing a list of sourcing methods to apply, the sourcing policy also defines parameters to be used to evaluate the suppliers found. The parameters include: a target number of quotes to be obtained for each item and a target probability of obtaining the number of desired quotes. For example, a sourcing policy might define a goal of selecting sufficient suppliers to provide a 90% chance of obtaining 3 quotes for each item in the request.

The sourcing policy's job is to select the minimum number of suppliers who can meet the goals of the policy.

The evaluation process tries to remove each of the suppliers and determines if the effect of the removal is tolerable. The system determines the current probability of obtaining the desired number of quotes for each item given the current set of suppliers. The system then reduces that set by one and again computes the probability of obtaining the desired number of quotes. If the probabilities remain above the threshold set in the policy, then the supplier may be safely removed. This process continues until all suppliers have been examined. The remaining suppliers are those selected for quotation.

Suppliers may be pre-selected (see above) by the sourcing method(s) that found them. This can occur when a particular policy contains a sourcing method that wishes to guarantee that certain suppliers are solicited. For example, the policy may say that the customer can explicitly specify a supplier to be solicited, in addition to any that the system might propose. A customer might also have a policy stating that certain suppliers should always be solicited for certain commodities. The elimination process cannot remove these pre-selected suppliers.

The order in which the system attempt to remove the suppliers is important. Different sort orders support different goals. For example, if the goal is to minimize the total number of suppliers, then the system will rank suppliers by the sum of their probabilities. The system will remove suppliers in the order of smallest sum to largest sum. If the goal is to maximize the use of a certain class of supplier, say small businesses, then the system will sort the suppliers based on their business class and attempt to remove the "non-small" suppliers first. The sorting can be tailored depending on the goal of the policy.

Once the evaluation process is completed, the system has determined an optimized supplier list. This list some times referred to as a Request For Sources (RFS) may be retained in the system for further use, or returned to the user through the web portal.

Step (e): Request for Quotes

If the user requests the system to communicate with suppliers directly to establish a quote matrix, or optimized quote list, then the system now issues one or more Request for Quote(s) or RFQ to each supplier identified in the sourcing matrix, sending each supplier only the items appropriate for that supplier and selecting from a number of possible methods to deliver the RFQ to the supplier such as by email, URL, EDI, FAX, etc . . . Advancement in automated electronic communication has not reached the stage where each potential supplier is able to automatically receive a RFQ from the present system. The RFQ may be issued to the supplier in an automated or semi automated format, but frequently a human intervention is required on the supplier end to make the determination if the supplier can provide the material sought in the RFQ. These suppliers will often respond in a non machine readable format, requiring human intervention on behalf of the system to enter the data into the system. However where the supplier is able to reply in electronic fashion in the same format as the system sends, or in a similar transfer protocol usable by the present system and the supplier, no human intervention is required except in the case of trouble.

Receive quote responses back from the suppliers contacted in step (e). Each response contains the current price, the amount of time required for the supplier to ship the item after the receipt of the order ("lead time ARO"), the minimum quantity required to purchase, the quantity available, and other parameters associated with the item. The supplier may also quote an alternative to the item originally requested.

Step (f): Quote Evaluation

Figure 6:
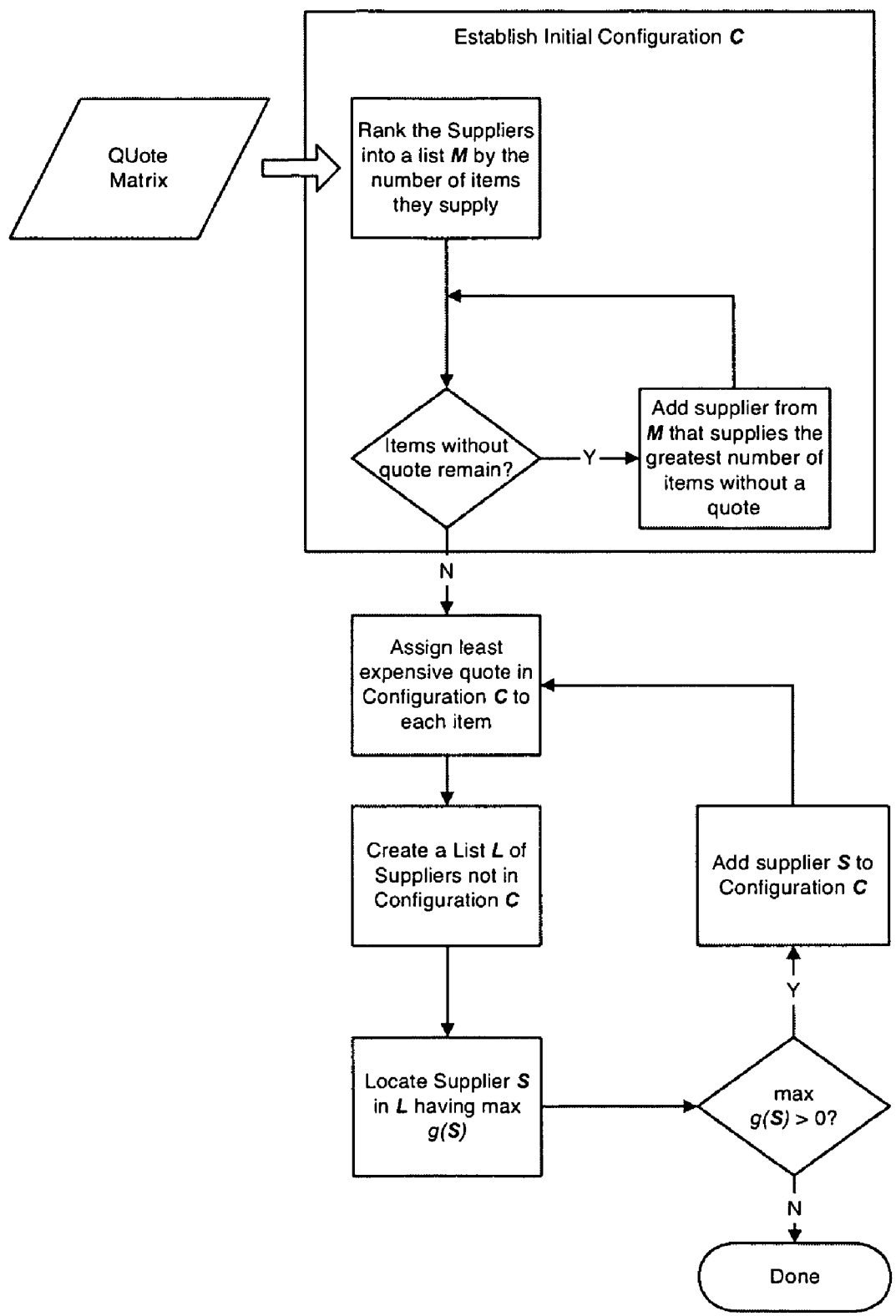
FIG. 6 Illustrates the quote matrix logic.

Place the received quotes into a quote matrix for evaluation. Once the actual pricing and availability are known and in the quote matrix, the system can proceed to select the actual suppliers who will receive orders. The logic for used to produce the quote matrix is illustrated in FIG. 6. Each cell now contains the supplier's quote including the part number (or substitute part number), quantity available, the date the product can be shipped by the supplier, etc. The system also records other supplier-specific data such as the method and effort required to deliver a purchase order to the supplier, the transactional cost of executing an order using the supplier's method, the supplier's business classification and/or size, etc.

In general, the system will have a set of line items, each with one or more quotes from different suppliers. The system places orders to satisfy each line item in such a way as to minimize the total cost to the customer.

The total cost for executing a set of orders to fulfill a set of line items is: Cost-of-Goods (COG)+Cost-of-Processing (COP), where COG is given by:

$$\sum_{i=0}^{items} p(q_i)$$

where $p(q_i)$ gives the price of the quote(s) selected for item i, and COP is given by:

$$\sum_{j=0}^{orders} p(s_j)$$

where $p(s_j)$ gives the cost for processing a purchase order placed with the supplier assigned order j. The cost for processing may be based on the type of order (e.g. a credit card or catalog order may have a different associated processing cost vs. a standard purchase order), the supplier's performance rating or other factors.

The general solution to the problem requires computing the total cost for each possible configuration of orders and finding the minimum.

The number of configurations is given by:

$$\prod_{i=1}^{items} q(i)$$

where $q(i)$ gives the number of possible quotes for item i

In other words:

(possible quotes for item 1)*(possible quotes for item)* . . . *(possible quotes for item n)

This quickly becomes impractical to compute. For example, with a 20 item by 3 quote matrix, the number of possibilities is: $3^{20}$ or 3,486,784,401. The method of the present invention solves this problem by implementing the following solution:

Let I be the set of line items to be ordered.
Let $Q_i$ be the set of possible quotes for item i, i ∈ I
Let $q_i$ be the quote selected for item i, $q_i \in Q_i$
Let $q'_i$ be a different quote for item i, $q'_i \in Q_i$ $q'_i \neq q_i$
Let $c(q_i)$ be the cost of quote $q_i$
Let C be a configuration of quotes where for each item i ∈ I we choose one or more of the quotes $q_i$ for item i, $q_i \in Q_i$
Let p(s) be the processing cost of placing an order with supplier s
Let f(C) be the cost of a configuration C including cost-of-goods and cost of PO processing, p(s), for each supplier in the configuration.

Then,

Establish an initial configuration C as follows:
Rank the suppliers by the number of items they can supply
Choose the supplier with the largest number of items
For the remaining items, choose the supplier that supplies the greatest number of those items
Repeat step 3 until there is a quote assigned to each item
Then:
For each supplier s, s ∈ s compute the maximum savings m(s) that supplier s can provide as follows:
Let e(i) be the most expensive quote for item i
Let $Q_s$ be the set of quotes provided by supplier s
Let $q_{si}$ be supplier s's quote for item i, $q_{si} \in Q_s$
Let $$m(s) = \sum_{i \in Q_s} e(i) - q_{si}$$

Repeat the following:
For each supplier s not currently in the configuration s ∈ S, s ∉ C
If m(s)<p(s) then skip this supplier
Compute the savings from adding this supplier as:

$$\Delta s = -p(s) + \sum_{q_{si} \in Q}^{c(q_{si}) < c(q_i)} c(q_i) - c(q_{si})$$

Record the supplier with the greatest value for Δs
End For each
If the largest value of Δs>0
Add supplier s to the configuration and move the quotes found above to that supplier
End if Alternatively, the process described above can be executed following the process steps illustrated in FIG. 6 using the following definition set.

Definitions:
Let g(s) be the cost savings produced by adding supplier s to configuration C computed as:

$$g(s) = -p(s) + \sum_{q'_s \in Q_s} c(q_i) - c(q'_i), \forall i : c(q'_i) < c(q_i)$$

where:
p(s)=the processing cost of placing an order with supplier s
$Q_s$=the set of quotes available from supplier s
c(q)=the cost of the quote q
$q_i$=the quote selected for item i in the current configuration C In the current configuration, if any item does not have the least expensive quote available from the suppliers in that configuration, move that quote to that item.

For each supplier it is possible to remove from the current configuration (the remaining suppliers in the configuration have quotes that can replace the supplier's quotes), remove that supplier iff the difference between the cost of the supplier's quotes and the replacement quotes is < the cost of processing an order for the replacement supplier.

Repeat this procedure until no further cost savings can be realized.

End Repeat

If the original request was a RFQ the system returns the quote matrix (FIG. 7) to the customer and the process ends. Otherwise the system continues with step (f)

Step (f): Product Ordering

The system issue orders to the suppliers based on the results of evaluating the quote matrix. The system constructs the orders using the items appropriate for that supplier and delivers the order using one of a number of possible methods as described above.

After confirming receipt and acceptance of the order with the supplier(s) the system will issue order confirmations to the user containing the details of the orders. Once orders are placed the users may provide feed back to the system that may help improve future performance (by requesting additional line item details, or requesting new implementation features).

While the description above refers to particular embodiments of the present invention, it will be understood that many modifications may be made without departing from the spirit thereof. The accompanying claims are intended to cover such modifications as would fall within the true scope and spirit of the present invention.

The invention claimed is:

1. A computer-implemented method of determining a supplier list for a user using a web based server-client computer system, the method comprising:

under control of one or more computer systems configured with executable instructions, (a) receiving a query from a user through a web portal, said query having information for one or more goods requested by the user;

(b) assigning a policy to said query, the policy having one or more search methods and one or more evaluation methods, said one or more search methods configured to perform a correlation operation on a partitioned database comprising data relating to suppliers and goods provided by the suppliers, the correlation operation determining one or more probability values for one or more suppliers to have the one or more goods, the partitioned database maintaining a separate data structure for each search method, wherein said one or more search methods further comprise a mathematical operation used to determine probabilities between variables;

(c) executing said one or more search methods to produce a correlation list between said one or more goods and said one or more suppliers based on the determined one or more probability values;

(d) evaluating said correlation list based on one or more predetermined evaluation criteria using said one or more evaluation methods;

(e) based on the correlation list evaluation, producing an optimized supplier list, wherein said optimized supplier list is returned to said user through said web portal; and (f) obtaining valid quotes from the one or more suppliers identified on said optimized supplier list, wherein the producing the correlation list includes computing a probability of obtaining a valid quote from the one or more suppliers based on prior iterations of the one or more search methods, and producing the optimized supplier list includes computing a probability of obtaining a desired number of quotes based on removal of one or more of the identified suppliers, and if the probability of obtaining a desired number of quotes remains above a threshold set in the policy, then removing said one or more of the identified suppliers from the optimized supplier list.

2. The method of claim 1, further comprising:

(g) purchasing the one or more goods from at least one supplier identified by the optimized supplier list for delivery to the user.

3. The method of claim 1, wherein said partitioned database is a dynamic database.

4. The method of claim 3, wherein said dynamic database further comprises a plurality of associated data structures.

5. The method of claim 3, wherein said dynamic database is updated using information obtained through said one or more search methods.

6. The method of claim 3, wherein said dynamic database is updated using information obtained through said one or more evaluation methods.

7. The method of claim 1, further comprising creating an initial structure of at least one of the separate data structures of the partitioned database based on parsing of product data received from one or more of the suppliers.

8. The method of claim 1, wherein assigning a policy to said query includes parsing the query and converting data from the query to a set of canonical tokens.

9. The method of claim 1, wherein producing the optimized supplier list includes creating a hierarchical list of identified suppliers based on a parameter included in the assigned policy and removing lower ranked suppliers.

10. A non-transitory computer readable storage medium containing instructions for producing a supplier list that, when executed by a computer, cause the computer to:

(a) receive a query from a user through a web portal, said query having information for one or more goods requested by the user;

(b) assign a policy to said query, the policy having one or more search methods and one or more evaluation methods, said one or more search methods configured to perform a correlation operation on a partitioned database comprising data relating to suppliers and goods provided by the suppliers, the correlation operation determining one or more probability values for one or more suppliers to have the one or more goods, the partitioned database maintaining a separate data structure for each search method, wherein said one or more search methods further comprise a mathematical operation used to determine probabilities between variables;

(c) execute said one or more search methods to produce a correlation list between said one or more goods and one or more suppliers based on the determined one or more probability values;

(d) evaluate said correlation list based on one or more predetermined evaluation criteria using said one or more evaluation methods;

(e) based on the correlation list evaluation, producing an optimized supplier list, wherein said optimized supplier list is returned to said user through said web portal; and (f) obtain valid quotes from the one or more suppliers identified on said optimized supplier list, wherein the producing the correlation list includes computing a probability of obtaining a valid quote from the one or more suppliers based on prior iterations of the one or more search methods, and produce the optimized supplier list includes computing a probability of obtaining a desired number of quotes based on removal of one or more of the identified suppliers, and if the probability of obtaining a desired number of quotes remains above a threshold set in the policy, then removing said one or more of the identified suppliers from the optimized supplier list.

11. The computer readable storage medium of claim 10, further comprising instructions for creating an initial structure of at least one of the separate data structures of the partitioned database based on parsing of product data received from one or more of the suppliers.

12. The computer readable storage medium of claim 10, wherein assigning a policy to said query includes parsing the query and converting data from the query to a set of canonical tokens.

13. The computer readable storage medium of claim 10, wherein producing the optimized supplier list includes creating a hierarchical list of identified suppliers based on a parameter included in the assigned policy and removing lower ranked suppliers.

* * * * *